United States Patent [19]
Sibigtroth et al.

[11] Patent Number: 5,386,534
[45] Date of Patent: Jan. 31, 1995

[54] DATA PROCESSING SYSTEM FOR GENERATING SYMMETRICAL RANGE OF ADDRESSES OF INSTRUCTING-ADDRESS-VALUE WITH THE USE OF INVERTING SIGN VALUE

[75] Inventors: James M. Sibigtroth, Round Rock; J. Greg Viot, Austin; John A. Langan, Austin; James L. Broseghini, Austin, all of Tex.

[73] Assignee: Motorola, Inc., Schaumburg, Ill.

[21] Appl. No.: 967,295

[22] Filed: Oct. 27, 1992

[51] Int. Cl.$^6$ .......................... G06F 12/06; G06F 9/34
[52] U.S. Cl. ..................................... 395/400; 395/375; 364/251.1; 364/255.1; 364/247.2; 364/254.8; 364/255.2; 364/255.5
[58] Field of Search ................. 395/375, 400, 425, 800

[56] References Cited

U.S. PATENT DOCUMENTS

| | | | |
|---|---|---|---|
| 4,075,688 | 2/1978 | Lynch, Jr. et al. | 395/800 |
| 4,432,053 | 2/1984 | Gaither et al. | 395/400 |
| 4,466,056 | 8/1984 | Tanahashi | 395/400 |
| 4,531,200 | 7/1985 | Whitley | 395/375 |
| 4,538,223 | 8/1985 | Vahlstrom et al. | 395/400 |
| 4,799,151 | 1/1989 | Iwao | 395/375 |
| 4,819,165 | 4/1989 | Lenoski | 395/400 |
| 4,916,606 | 4/1990 | Yamaoka et al. | 395/375 |
| 4,935,867 | 6/1990 | Wang et al. | 395/400 |
| 5,148,538 | 9/1992 | Celtruda et al. | 395/425 |
| 5,150,471 | 9/1992 | Tipon et al. | 395/400 |
| 5,155,818 | 10/1992 | Stein et al. | 395/375 |
| 5,204,953 | 4/1993 | Dixit | 395/400 |
| 5,226,129 | 7/1993 | Ooi et al. | 395/375 |
| 5,269,012 | 12/1993 | Nakajima | 395/425 |
| 5,276,819 | 1/1994 | Rau et al. | 395/375 |
| 5,283,874 | 2/1994 | Hammond | 395/375 |

FOREIGN PATENT DOCUMENTS

0328063A2 2/1989 European Pat. Off. .
WO83/00241 1/1983 WIPO .

OTHER PUBLICATIONS

"MC6809-MC6809E Microprocessor Programming Manual" published by Motorola, Inc. on Mar. 1, 1981, pp. 2-1 to 2-5/2-6.
"M68HC11 Reference Manual" published by Motorola, Inc. in 1988, pp. 6-9 to 6-10.
Intel; "i486 TM Processor Programmer's Reference Manual"; pp. 2-3, 2-6, 2-7, 2-15 to 2-16, and E-21 1990.
Intel; "i486 TM Processor Hardware Reference Manual"; pp. 1-1 to 1-3, 2-2, 2-3, 2-11 & 2-13, 1990.
Tanenbaum; "Structured Computer Organization"; Prentice-Hall, pp. 213-241, 1984.

Primary Examiner—Parshotam S. Lall
Assistant Examiner—Krisna Lim
Attorney, Agent, or Firm—Elizabeth A. Apperley

[57] ABSTRACT

A data processing system (10) performs indexed addressing, autoincrementing, and autodecrementing using power of two byte boundaries. For example, a 5-bit offset allows a user to progress sixteen bytes either forward or backward through a table of data. An instruction specifying an operation to be performed, a pointer register (58, 60), and an offset value is provided to an execution unit (14). The pointer register (58, 60) stores a first address value and the offset value has a sign and a magnitude. An arithmetic logic unit, ALU, (52) inverts the sign of the offset value to provide an inverted sign value. A plurality of adders (100, 102, 104, 106, and 108) adds the offset value, the first address value, and the inverted sign value to generate an offset sum. A positive offset value is increased by one to generate a symmetric power of two offset range.

11 Claims, 3 Drawing Sheets

DATA PROCESSING SYSTEM FOR GENERATING SYMMETRICAL RANGE OF ADDRESSES OF INSTRUCTING-ADDRESS-VALUE WITH THE USE OF INVERTING SIGN VALUE

FIELD OF THE INVENTION

This invention relates generally to a data processing system, and more particularly to calculating an offset in a data processing system.

BACKGROUND OF THE INVENTION

A wide variety of addressing modes have been developed to provide more flexibility during operation of microcontrollers and microprocessors. For example, indexed addressing was developed to allow a programmer to access elements of a table or array more easily. Generally, in indexed addressing, a CPU of a data processor adds the contents of an index register to an offset supplied with an instruction to form an effective address. In some implementations, a pointer register other than the index register may be used.

In Motorola's MC6809 microprocessor, indexed addressing was expanded to include a constant offset mode. The MC6809 microprocessor is commercially available from Motorola, Inc. of Austin, Tex. In the constant offset mode of operation, an offset in two's complement form is added to the contents of one of a plurality of pointer registers to form an effective address. Offset sizes of 5-bits ($-16$ to $+15$), 8-bits ($-128$ to $+127$), and 16-bits ($-32768$ to $+32767$) are available. Additionally, no offset may also be specified. The 5-bit offset value is contained in a postbyte. A postbyte is a byte which is included after an operand and generally includes encoded information indicating a type of operation to be performed and a pointer register in addition to the 5-bit offset value. Because the type of operation to be performed and the pointer register must also be specified in the postbyte, the offset value is typically limited to a maximum value of five bits. The 8-bit and 16-bit offset values are contained in the byte or bytes immediately following the postbyte.

An accumulator offset mode of operation may also be implemented in microcontrollers and microprocessors. In the accumulator offset mode of operation, the contents of the pointer register are added to an offset value contained in an accumulator to form the effective address.

The indexed addressing mode of operation generally available on microprocessors provides a flexible method for accessing addresses, especially when the addresses form a table or an array. However, in the case of a signed offset, the offset range is not symmetric about zero. As was previously stated, the offset ranges from $-16$ to $+15$, $-128$ to $+127$, or $-32768$ to $+32767$. Because the offset is signed, both the positive and negative limits of the offset range must reflect a sign bit. Hence, a value of $+15$ has a binary form of 01111. A binary value of 10000 represents a decimal value of $-16$ rather than a decimal value of $+16$ because the most significant bit must reflect the sign of the offset Therefore, when a user of the microprocessor uses signed indexed addressing, the positive limit of the offset range is $2^{(n-1)}-1$, where n is the number of bits of the offset value, a value which is not commonly used. Most applications require an increment of a power of two number of bytes, such as eight or sixteen. Therefore, if the user must increment through a table in sixteen byte steps, the 8-bit offset must be used to provide an offset of sixteen because a 5-bit offset would have a maximum positive range of fifteen bytes. As was previously mentioned, the 8-bit offset generally requires an additional byte in the encoded instruction. Therefore, an additional byte of programming space must be used to specify the positive sixteen byte offset value. In many microcontroller and microprocessor applications, a limited amount of internal programming memory is provided and each byte of programming space is very valuable.

In addition to calculating the effective address using either the constant offset mode of operation or the accumulator offset mode of operation, a two's complement offset may be used to automatically increment or decrement a pointer register. When automatically incrementing, or autoincrementing, the contents of the pointer register are incremented by either one or two. When automatically decrementing, or autodecrementing, the contents of the pointer register are typically decremented by either one or two. Autoincrementing and autodecrementing are useful for accessing tables which store information. However, the value in the pointer register may only be modified by one or two bytes. Therefore, the autoincrementing and autodecrementing operations are typically only useful in limited situations in which a next needed piece of information is within one or two bytes of the address currently in the pointer register used to perform the operations.

SUMMARY OF THE INVENTION

The previously mentioned needs are fulfilled with the present invention. Accordingly, there is provided, in one form, a data processing system for calculating an offset sum. The data processing system includes an interface circuit for receiving an instruction having an offset value. The instruction has a first portion for specifying an operation to be executed and a second portion for specifying the offset value having both a sign portion and a magnitude portion. The interface circuit also receives a first address value. An instruction decode circuit is also included in the data processing system for decoding the instruction to provide a plurality of control signals. The instruction decode circuit is connected to the input circuit for receiving the instruction. A register for storing the first address value during execution of the instruction is connected to the interface circuit for receiving the first address value. An arithmetic logic circuit is connected to the register for receiving a portion of the first address value. The arithmetic logic circuit is connected to the input circuit for receiving the offset value and is connected to the instruction decode circuit for receiving a portion of the plurality of control signals. The arithmetic logic circuit inverts the sign portion of the offset value to provide an inverted offset sign value. The arithmetic logic circuit adds each of the first address value, the sign portion and the magnitude portion of the offset value, and the inverted offset sign value to generate an offset sum. The offset sum is within a symmetrical range of the first address value but is not equal to the first address value. In a second form, a method for calculating an offset sum is provided. In a first step, an instruction having an offset value is received. The instruction has a first portion for specifying an operation to be executed and a second portion for specifying the offset value has both a sign portion and a magnitude portion. A first address value is also received. The instruction is decoded to provide a plurality of control signals in response to receiving the instruction. The first address value is stored during execution of the instruction. The sign portion of the offset value is inverted to provide an inverted offset sign value. Each of the first address value, the sign portion and the magnitude portion of the offset value, and the inverted offset sign value is added to generate an offset sum. The offset sum is within a symmetrical range of the first address value but not being equal to the first address value.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a circuit and a method for performing indexed addressing, autoincrementing, and autodecrementing on commonly used byte boundaries. Commonly used boundaries are generally powers of two such as eight, sixteen, and one hundred twenty-eight. Additionally, the offset ranges are encoded in a small number of bits as possible and have both positive and negative limits. A user of this implementation of the invention may progress through a table or array on power of two size boundaries both in the positive and negative direction. For example, a 5-bit offset allows a user to progress by sixteen bytes at a time either forward or backward through a table or an array. Five bits may be used to encode the offset in a post-byte so that programming space is conserved. Additionally, an 8-bit offset could provide an offset range of −128 to +128 bytes and a 16-bit offset could provide a range of −32768 to +32768 bytes. In each case, memory programming space is conserved. However, the savings are most noticeable with small offset values.

The present invention achieves symmetric-about-zero addressing ranges using signed offsets by means of a modification of the arithmetical hardware used for address calculation. The result is an addressing range of $-2^{(n-1)}$ to $+2^{(n-1)}$, where n is the number of bits of the offset value. However, the address calculation hardware of the present invention cannot provide an offset of zero from the base address value. Most data processors provide an alternate method of address calculation, which can provide a no-offset address from a base address value. Therefore, the present invention can be used in such processors with no net decrease in functionality.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Figure 1:
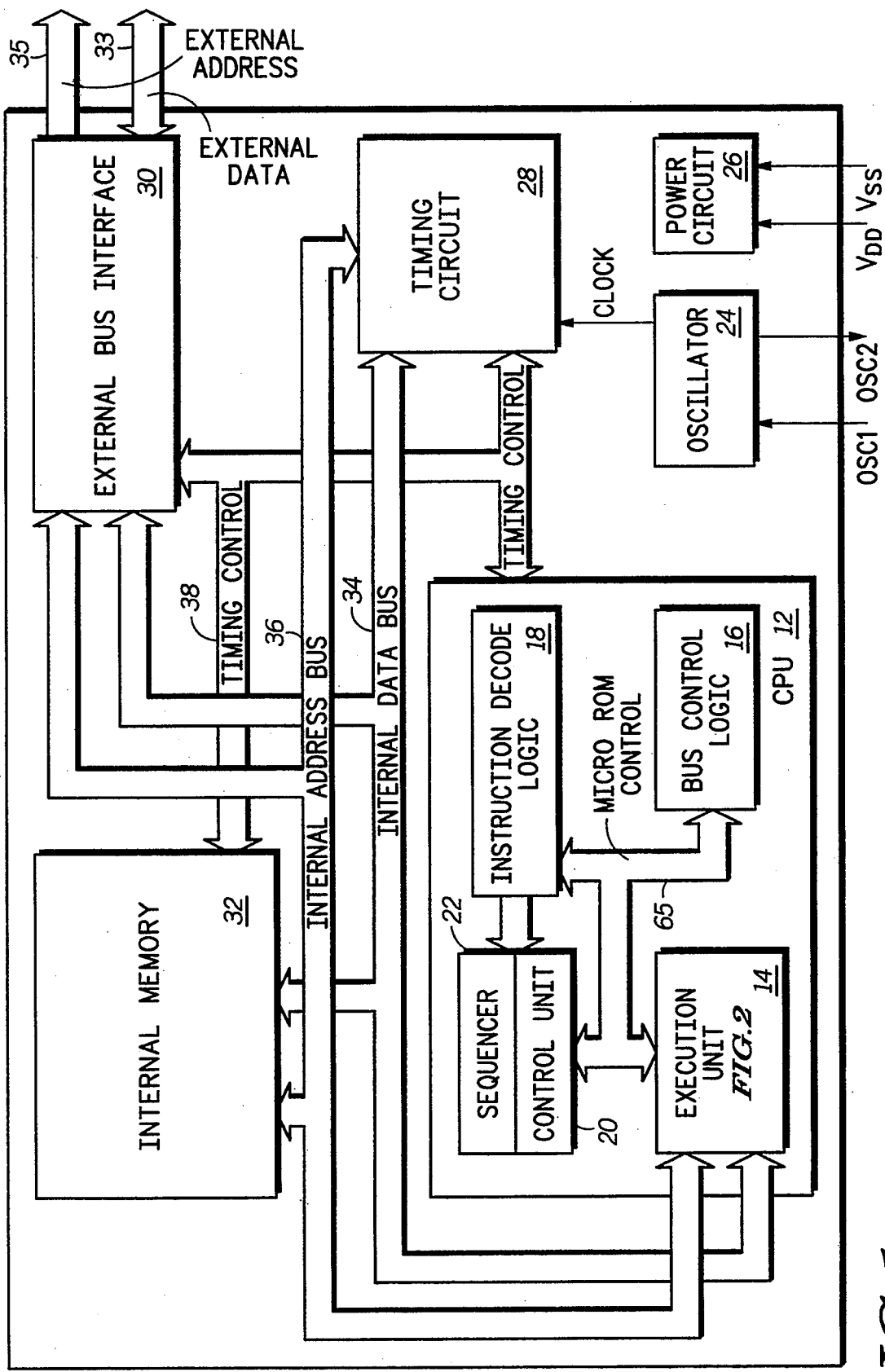
FIG. 1 illustrates in block diagram form a data processing system in accordance with the present invention.

One implementation of the instruction and method of operation described above is implemented in a modified form of a MC68HC11 micro controller. The MC68HC11 is an eight bit micro controller which includes sixteen bit addresses and storage registers and is available from Motorola, Inc. of Austin, Tex. This implementation is illustrated in greater detail in FIG. 1. FIG. 1 depicts a data processing system 10 in which the indexed addressing, autoincrementing, and autodecrementing operations previously described may be implemented. Data processing system 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 10. Operation of a crystal oscillator is well known in the data processing art and should be apparent to one with ordinary skill in the art.

Power circuit 26 receives both a "Vdd" and a "Vss" signal from an external power source. The Vdd signal provides a positive voltage and the Vss signal provides a reference, or ground voltage. The Vdd and Vss signals are provided to each of the remaining components of data processing system 10. The routing of these signals is well known in data processing art and will be apparent to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 to an External Address bus 35. Similarly, a plurality of data values are communicated by external bus interface 30 via an External Data bus 33. External bus interface 30 controls receipt and transmission of address and data values between an external user and data processing system 10. External bus interface 30 communicates a plurality of address and data values to a remaining portion of data processing system 10 via an Internal Address bus 36 and an Internal Data bus 34, respectively.

Internal memory 32 functions to store information necessary for the proper operation of data processing system 10. Additionally, other data values may be stored therein if specified in a user program provided via Internal Address bus 36 and Internal Data bus 34.

CPU 12 executes a plurality of instructions during operation of data processing system 10. Although many forms of instruction may be executed in data processing system 10, the discussion herein will concentrate on indexed addressing, autoincrementing, and autodecrementing operations. Internal Address bus 36 and Internal Data bus 34 communicate information between execution unit 14 and a remaining portion of data processing system 10. Bus control logic circuit 16 fetches the plurality of instructions. Each of the instructions is then decoded by instruction decode logic circuit 18 and provided to control unit 20 and sequencer 22. Control unit 20 and sequencer 22 maintain a sequence of execution of each of the plurality of instructions to most efficiently utilize the computing capabilities of data processing system 10. Additionally, control unit 20 includes a Micro-ROM memory (not shown) which provides control information to each of execution unit 14, bus control logic 16, and instruction decode logic 18 via a Micro-ROM Control Bus 65. The control information is necessary for proper execution of instructions.

Figure 2:
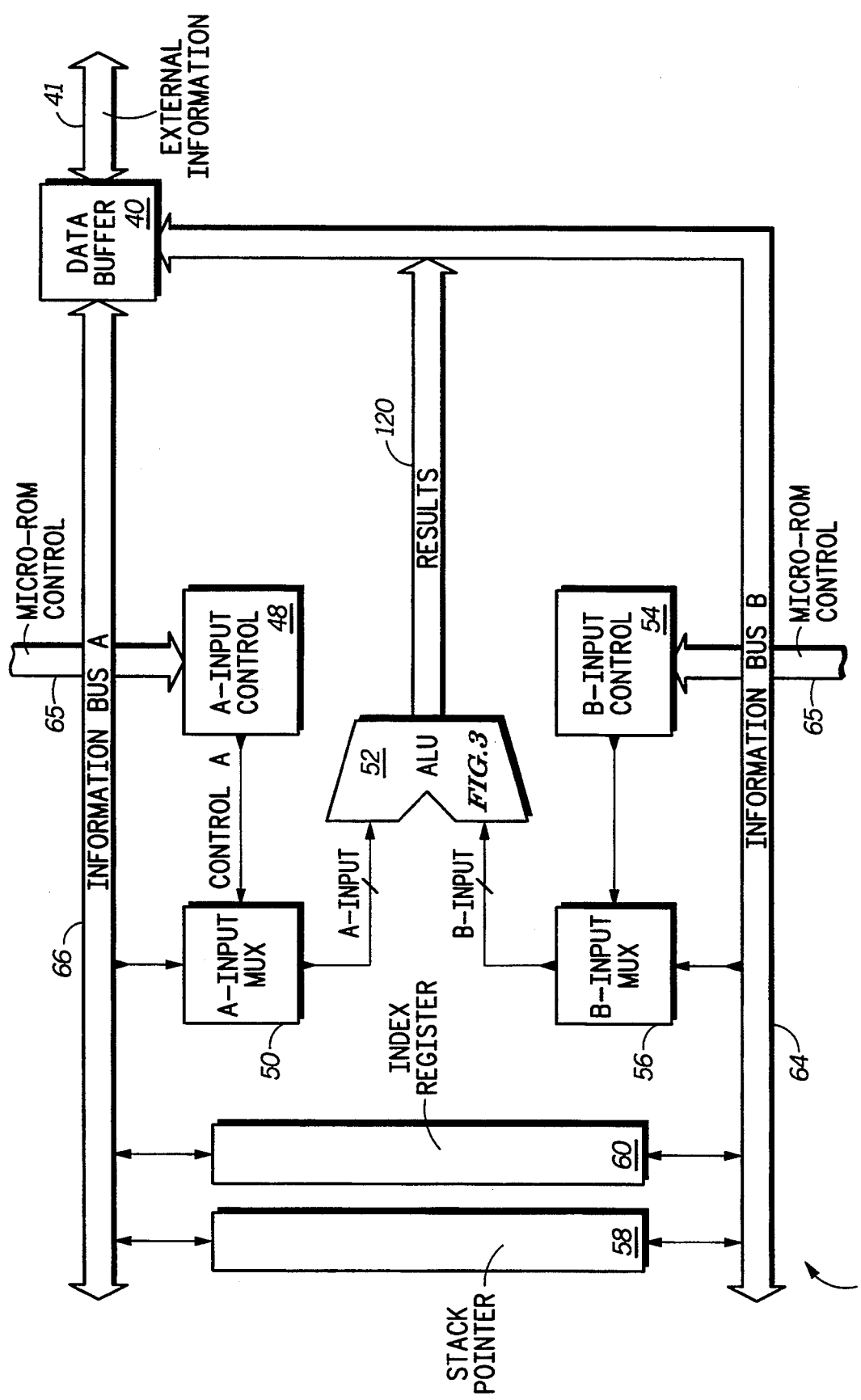
FIG. 2 illustrates in block diagram form an execution unit of FIG. 1.

Execution unit 14 is illustrated in greater detail in FIG. 2. Execution unit 14 generally includes a data buffer 40, an A-input control circuit 48, an A-input multiplexor 50, an arithmetic logic unit (ALU) 52, a B-input control circuit 54, a B-input multiplexor 56, a stack pointer 58, and an index register 60. In addition to stack pointer 58 and index register 60, other storage registers may be implemented in execution unit 14. For example, a condition code register or a stack pointer may also be included. Implementation and use of such storage registers is well known in the art and will be apparent to one with ordinary skill in the art.

An External Information bus 41 provides address and data information to data buffer 40. External Information bus 41 receives the address and data information from Internal Address bus 36 and Internal Data bus 34, respectively. Data buffer 40 provides the values transferred via External Information bus 40 to remaining portions of execution unit 14 via an Information Bus A 66 and an Information Bus B 64. Although not shown in detail here, both Information Bus A 66 and Information Bus B 64 are sixteen bits wide.

A first and a second input of stack pointer 58 are bidirectionally coupled to Information Bus A 66 and Information Bus B 64, respectively. Similarly, a first and a second input of index register 60 are bidirectionally coupled to Information Bus A 66 and Information Bus B 64, respectively. Any additional registers such as a stack pointer and a condition code register would be similarly coupled to Information Bus A 66 and Information Bus B 64.

A plurality of control signals are provided to both A-input control logic 48 and B-input control logic 54 via the Micro-ROM Control bus 65. Micro-ROM Control bus 65 provides the plurality of control signals in response to information provided by a Micro-ROM memory (not shown) in control unit 20. The Micro-ROM memory generally provides information necessary for controlling execution of one of the plurality of instructions.

A-input control 48 provides a "Control A" signal to a control input of A-input multiplexor 50. Information Bus A 66 is connected to a data input of A-input multiplexor 50. A-input multiplexor 50 provides an output labeled "A-Input" to a first input of ALU 52. B-Input control 54 provides a "Control B" signal to a control input of B-input multiplexor 56. Information Bus B 64 is connected to a data input of B-input multiplexor 56. B-input multiplexor 56 provides an output labeled "B-Input" to a second input of ALU 52.

ALU 52 processes each of the inputs to provide a plurality of results which are transferred via a Results bus 120. Results bus 120 provides the plurality of results to either data buffer 40, stack pointer 58, or index register 60 via Information Bus B 64.

Figure 3:
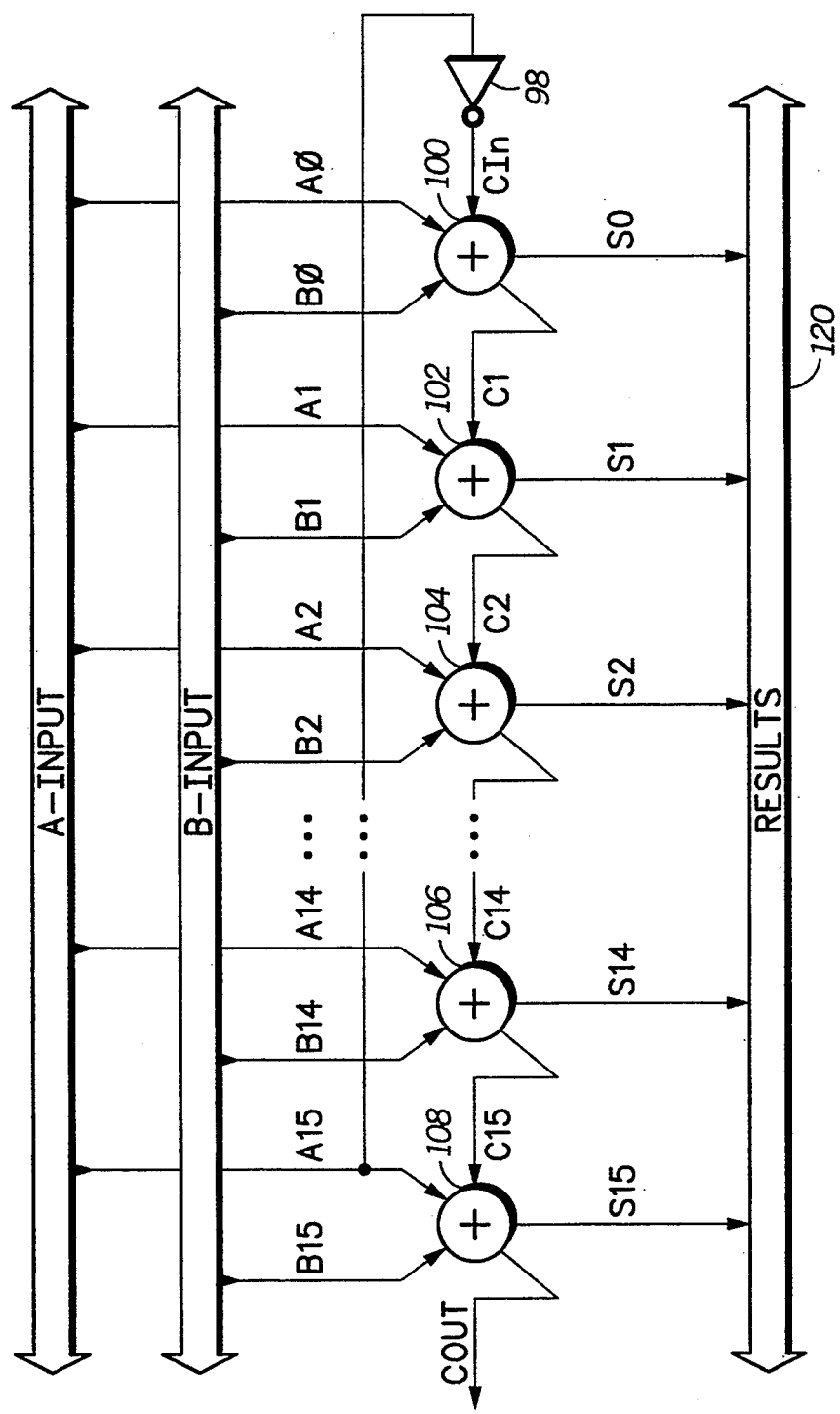
FIG. 3 illustrates in block diagram form an arithmetic logic unit of FIG. 2.

ALU 52 is illustrated in more detail in FIG. 3. In the embodiment of the invention illustrated in FIG. 3, ALU 52 is configured to execute operations which require calculation of an offset value. Such operations include constant offset mode operations, autoincrementing, and autodecrementing. When ALU 52 is not executing one of the operations listed above, ALU 52 may be configured in another manner more conducive to executing the other operations. Typically, a multiplexor (not shown) might be used to enable ALU 52 to have a variety of configurations which are application specific. It should be obvious to one with ordinary skill that ALU 52 may have variable configurations.

In FIG. 3, ALU 52 generally includes an inverter 98 and a first plurality of adder circuits (100, 102, 104, 106, and 108). The A-Input signal provides a first plurality of bits respectively labeled "A0," "A1," "A2," "A14," and "A15." Bit A0 is provided to a first input of adder 100. Similarly, bits A1 through A15 are each provided to a first input of adder 102, adder 104, adder 106, and adder 108, respectively. The B-Input signal provides a second plurality of bits respectively labeled "B0," "B1," "B2," "B14," and "B15." Bit B0 is provided to a second input of adder 100. Likewise, bits B1 through B15 are each provided to a second input of adder 102, adder 104, adder 106, and adder 108, respectively. The A15 signal is connected to an input of inverter 98. Although not shown in detail in FIG. 3, each of bits A3 through A13 and B3 through B13 are provided to a respective one of a second plurality of adders (not shown). Each of the second plurality of adders (not shown) function the same as adders 100 through 108 and, therefore, is similarly configured.

A signal labeled "Cin" is output by inverter 98 and provided to a third input of adder 100. Adder 100 outputs a sum signal labeled "S0." Additionally, adder 100 provides a signal labeled "C1" to a third input of adder 102. Adder 102 provides a sum signal labeled "S1." Adder 102 also generates a signal labeled "C2" which is provided to a third input of adder 104. Adder 104 provides a sum output labeled "S2" and a signal labeled "C3." The C3 signal is provided to a third input of a next adder (not shown). Eventually, a carry chain formed by the plurality of adders (not shown) propagates a carry signal labeled "C14" to a third input of adder 106. Adder 106 outputs a sum signal labeled "S14" and a carry signal labeled "C15." The C15 signal is provided to a third input to adder 108. Adder 108 outputs a sum signal labeled "S15" and a carry signal labeled "Cout." Each of the sum signals, S0 through S15 are provided to a remaining portion of execution unit 14 via Results bus 120. Although not shown in detail in FIG. 3, each of the second plurality of adders described above provides sum signals S3 through S13 to Results bus 120. Additionally, each of the second plurality of adders also provides a carry signal to a next one of the plurality of adders. Each of the second plurality of adders (not shown) function the same as adders 100 through 108 and, therefore, is similarly configured.

During execution of an indexed addressing, autoincrementing, or autodecrementing operation, a user provides a corresponding instruction to data processing system 10. Typically, an instruction which uses indexed addressing will have a mnemonic form which provides both an opcode indicating a type of operation to be performed and operands indicating one or several data values which are to be operated on by the opcode. In the example described herein, assume that an indexed addressing mode instruction has a format which includes an opcode, an offset value and a pointer register which stores an initial address value. Such a format is well known in the data processing art and will not be discussed in further detail herein.

The offset is typically either a constant offset value or a value stored in an accumulator. The pointer register may be implemented as an index register, a stack pointer, or a program counter register. Additional accumulators and other registers commonly known in the data processing art may also be used as the pointer register. The contents of the pointer register are generally stored therein by a user of data processing system 10 before execution of the indexed addressing, autoincrementing, or autodecrementing operation. The autoincrementing and autodecrementing operations also have a predetermined instruction format which is determined by a designer of the system. An offset value to be added or subtracted is typically provided in the predetermined instruction format for autoincrementing and autodecrementing operations.

As was previously mentioned, during execution of an operation requiring calculation of an offset value, the user provides an appropriate instruction through a software program stored either externally or in internal memory 32. Should the instruction be provided by a source external to data processing system 10, the instruction would be input via External Data bus 33 to external bus interface 30. External bus interface 30 would subsequently provide the instruction to CPU 12 via Internal Data bus 34. If the instruction is provided by a software program in internal memory 32, the instruction is provided to CPU 12 via Internal Data bus 34. In CPU 12, execution unit 14 provides the instruction to instruction decode logic circuit 18 in response to control signals received from each of bus control logic circuit 16, control unit 20, and sequencer 22. Instruction decode logic circuit 18 subsequently decodes the instruction to provide a plurality of control and information signals necessary for the proper execution of the instruction. Included in the plurality of control and information signals is the offset value in a modified two's complement form necessary for indexed addressing, autoincrementing, and autodecrementing operations.

Upon receipt and decoding of the instruction, execution unit 14 begins the steps necessary to perform an operation involving either indexed addressing, autoincrementing, or autodecrementing. As was previously mentioned, the user of data processing system 10 stores an initial value to which the offset value is to be added in either one or both of stack pointer 58 and index register 60.

In a first example, assume that the user of data processing system 10 provides an instruction which uses indexed addressing having a five bit wide signed constant offset. The instruction specifies both that an initial address value is stored in index register 60 of execution unit 14 and a signed value of the offset which is to be added to that initial address value. The offset value is provided to data buffer 40 via External Information bus 41. Data buffer 40 provides the offset value to A-Input multiplexor 50 via Information Bus A 66.

At an appropriate point in execution of the operation specified in the user's instruction, a plurality of timing and control signals are provided to both A-Input Control circuit 48 and B-Input control circuit 54 via Micro-ROM Control bus 65. Additionally, a plurality of control signals are provided to each of stack pointer 58 and index register 60 to enable each to either store or provide a value at an appropriate point in time during execution of the instruction. Routing of the plurality of control signals to registers such as stack pointer 58 and index register 60 are well known in the data processing art and will not be discussed in further detail herein.

Upon receipt of the appropriate plurality of control signals, index register 60 provides the initial address value to B-Input multiplexor 56. Upon receipt of the plurality of timing and control signals via Micro-ROM control bus 65, A-Input control circuit 48 is enabled to provide the Control A signal to A-Input multiplexor 50. Similarly, B-Input control circuit 54 is enabled to provide the Control B signal to B-Input multiplexor 56.

When enabled by the Control A signal, A-Input multiplexor 50 provides the offset value as the A-Input value to a first input of ALU 52. Similarly, B-Input multiplexor 56 provides the initial address value to a second input of ALU 52.

Upon receipt of both the A-Input value and the B-Input value, adder 100 adds bit 0 of the offset value to bit 0 of the initial address value. Additionally, a Cin value is added to the sum of both bit 0's to provide both a bit 0 of a sum value and a carry value. Bit 0 of the sum value is labeled S0 and the carry value is labeled "C1." The Cin value is an inversion of the sign of the offset value. Calculation of the Cin value will be discussed later in further detail. Subsequently, each bit of the offset value is added to each corresponding bit of the initial address value. Because the offset value is only five bits wide and the initial address value is sixteen bits wide, the offset value is sign extended to be sixteen bits. A sum of the offset value and the effective address is then provided to data buffer 40 via Results bus 120. Data buffer 40 provides the sum to a remaining portion of CPU 12 via External Information bus 41.

As shown in FIG. 3, when a positive offset is provided via the A-Input signal, the sign of the offset is a zero which is sign extended from a last bit of the offset to a most significant bit. Therefore, the zero is provided to inverter 98. Inverter 98 then provides a Cin signal with a value of one to adder 100 to be added to the sum of the A0 and the B0 signals. Similarly, when a negative offset is provided, inverter 98 provides a value of zero to adder 100 to be added to the sum of the A0 and the B0 signals. By adding an inverse of the sign bit of the offset, the offset range is expanded to allow greater flexibility when calculating an effective address value.

The sign of the offset is extended, inverted, and used as the Cin signal to allow for a positive sixteen byte offset when using a five bit wide constant offset. In prior art implementations, the greatest signed positive offset possible using a five-bit value was fifteen bytes. By inverting the sign of the offset value and adding the inverted sign value to the sum of the offset and the initial address, a positive range of the offset is effectively increased by one. In other words, in this implementation of the invention, positive offsets are stored as (n−1), where n is a positive number front one to sixteen. Therefore, a binary value of 0000 translates to a +1 decimal value. Similarly, a binary value of 0111 translates to a +8 decimal value and a binary value of 01111 translates to a +16 value. An offset of zero is not possible when using this method. However, when an offset of zero is desired by the user of data processing system 10, the operation may be encoded differently to reflect that need. Typically, a specific instruction code exists for an instruction specifying no offset. Therefore, no functionality is lost.

In a second example of execution of an operation requiring an offset, assume that the user of data processing system 10 provides an instruction which requires autoincrementing having a four bit wide signed constant offset. The instruction specifies both that an initial value to be incremented is stored in stack pointer 58 of execution unit 14 and a signed value of the offset which is to be added to that initial value. As in the first example involving indexed addressing, the offset value is provided to data buffer 40 via External Information bus 41. Data buffer 40 provides the offset value to A-Input multiplexor 50 via Information Bus A 66.

At an appropriate point in execution of the operation specified in the user's instruction, a plurality of timing and control signals are provided to both A-Input Control circuit 48 and B-Input control circuit 54 via Micro-ROM Control bus 65. Additionally, a plurality of control signals are provided to enable stack pointer 58 to either store or provide the initial value at an appropriate point in time during execution of the autoincrementing instruction.

Upon receipt of the appropriate plurality of control signals, stack pointer 58 provides the initial value to B-Input multiplexor 56. A-Input control circuit 48 is enabled to provide the Control A signal to A-Input multiplexor 50 in response to the plurality of timing and control signals via Micro-ROM control bus 65. A-Input multiplexor 50 provides the offset value as the A-Input value to a first input of ALU 52. Similarly, B-Input control circuit 54 is enabled to provide the Control B signal to B-Input multiplexor 56. B-Input multiplexor 56 then provides the initial address value to a second input of ALU 52.

Upon receipt of both the A-Input value and the B-Input value, adder 100 adds bit 0 of the offset value to bit 0 of the initial address value. Additionally, a Cin value which is an inversion of the sign of the offset value is also added to the sum of the bit 0's of each of the offset value and the address value. As in the indexed addressing example, each bit of the offset value is added to each corresponding bit of the initial address value. Because the offset value is only four bits wide and the initial address value is sixteen bits wide, the offset value is sign extended to be sixteen bits. A sum of the offset value and the effective address is then stored in stack pointer 58 for subsequent use.

As shown in FIG. 3, when a positive offset is provided via the A-Input signal, the sign of the offset is a zero which is sign extended from a last bit of the offset to a most significant bit. Therefore, the zero is provided to inverter 98. Inverter 98 then provides a Cin signal with a value of one to adder 100 to be added to the sum of the A0 and the B0 signals. Similarly, when a negative offset is provided, inverter 98 provides a value of zero to adder 100 to be added to the sum of the A0 and the B0 signals. By adding an inverse of the sign bit of the offset, the offset range is expanded to allow greater flexibility when executing an autoincrementing or an autodecrementing operation.

By calculating the Cin signal in response to the sign of the offset, a positive eight byte offset is possible when using a four bit wide constant offset. As was previously stated, inverting the sign of the offset value and adding the inverted sign value to the sum of the offset and the initial address effectively increases the positive range of the offset by one. Therefore, a binary value of 0111 translates to a +8 decimal value. Again, art offset of zero is not possible when using this method.

In the second example described herein, pre-incrementing is described in which an offset is added to a value stored in a pointer register (stack pointer 58) before being used in a next data processing operation. Many variations may exist in autoincrementing and autodecrementing operations. For example, after an operation has generated a result and stored that result in the pointer register, the result is incremented by the offset. This is referred to as post incrementing. Similarly, an offset may be subtracted from the value stored in the pointer register. This operation is referred to as pre-decrementing if the subtraction occurs before the value in the pointer register is used to access an operand for an operation. The operation is referred to as post decrementing if the subtraction occurs after the value in the pointer register is used to access an operand for the operation. Similarly, although stack pointer 58 is used in the second example, any of the pointer registers previously described may also be used. For example, another index register or a general purpose register may also be used.

In the embodiment of the invention described herein, the positive range of a five bit offset value is effectively increased by one such that more meaningful offset values may be used to access information. For example, in prior art implementations of systems which calculate offsets, a range of −16 to +15 bytes was a maximum range for an instruction which only required a postbyte for encoding. As was previously mentioned, if the offset is to be provided in a postbyte, a portion of the bits forming the postbyte must be used to specify a pointer register and a type of operation to be performed. A remaining portion of the bits may be used to specify an offset value. As is typical and as is illustrated in the embodiment of the invention described herein, only five bits are available to be used to specify the offset value in the postbyte.

Data in a digital processing system is rarely arranged in fifteen byte increments. Rather, power of two multiples of bytes such as eight and sixteen are typically used. Therefore, prior art implementations would require another byte of programming space to encode a sixteen byte offset. The invention described herein allows a user to calculate offsets up to sixteen bytes away without using an additional byte of valuable programming space. When an eight bit offset is used, a +128 byte offset may be used without requiring an additional byte of programming space. Additionally, by modifying the structure of ALU 52, the embodiment of the invention illustrated herein, may also be used to extend the offset ranges of larger binary multiples of bytes such as +32768.

Additionally, in prior art implementations, autoincrementing and autodecrementing operations only allowed the contents of a pointer register to respectively be incremented or decremented by one or two bytes. Therefore, range of movement during an incrementing or decrementing operation was strictly limited. In the embodiment of the invention described herein, a value in a pointer register may be incremented or decremented by up to eight bytes. Again, by allowing incrementing and decrementing operations having boundaries that are a power of two, data may be accessed more easily and without consuming a large amount of programming space. The useful positive range for autoincrementing and autodecrementing operations is increased. As was previously mentioned, data in a digital processing system is commonly arranged in a power of two multiple of bytes such as eight and sixteen. Therefore, prior art implementations wouldn't have allowed a convenient implementation for progressing through data in tabular form. The invention described herein allows tables of data to be read in eight and sixteen byte increments with a single instruction which is quickly executed and does not require an excessive amount of programming space.

Although a user does not have the ability to specify an offset of zero, other opcodes and methods of operation typically exist in a system to perform a "no offset" operation. For example, a specific instruction code is generally present in most data processors to initiate execution of an operation having no offset. Therefore, the code typically used in prior art systems to execute a no offset operation, is redundant and may be eliminated without a loss of functionality of the data processor. This argument may be applied equally to indexed addressing, autoincrementing, and autodecrementing operations.

The implementation of the invention described herein is provided by way of example only. However, many other implementations may exist for executing the function described herein. For example, although only indexed addressing, autoincrementing, and autodecrementing operations are described in detail in this specification, the invention may be expanded to include several branch type operations. The offsets necessary when executing branch operations may be calculated using the method and circuitry described herein or another embodiment of the invention. Therefore, the offset range of the branch instruction may be extended to have a boundary which is a power of two.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system for calculating an offset sum, comprising wherein said symmetrical range of addresses is within a decimal range off $-2^{(n-1)}$ to $-1$ and $+1$ to $+2^{(n-1)}$:
   interface means for receiving an instruction having an index offset value, the instruction having a first portion for specifying an operation to be executed and a second portion for specifying the index offset value having both a sign portion, and a magnitude portion, the interface means also communicating a first address value corresponding to the instruction;
   instruction decode means for decoding the instruction to provide a plurality of control signals, the instruction decode means coupled to the interface means for receiving the instruction;
   a register for storing the first address value during execution of the instruction, the register coupled to the interface means for communicating the first address value; and
   an arithmetic logic circuit coupled to the register for receiving a portion of the first address value, the arithmetic logic circuit coupled to the interface means for receiving the index offset value, the arithmetic logic circuit coupled to the instruction decode means for receiving a portion of the plurality of control signals, the arithmetic logic circuit inverting the sign portion of the index offset value to provide an inverted offset sign value, the arithmetic logic circuit adding each of the first address value, the sign portion and the magnitude portion of the index offset value, and the inverted offset sign value to generate the offset sum, the offset sum being within a symmetrical range of addresses of the first address value and not being equal to the first address value.

2. The data processing system for calculating the offset sum of claim 1 wherein the index offset value is either a positive or a negative number, a magnitude of a positive offset number being increased by one and a magnitude of a negative offset number remaining unchanged.

3. The data processing system for calculating the offset sum of claim 1 wherein the index offset value is not equal to zero.

4. The data processing system for calculating the offset sum of claim 1 wherein the index offset value has a bit width of an integer number, n.

5. The data processing system for calculating the offset sum of claim 1 wherein the operation specified by the instruction is an autoincrementing or an autodecrementing operation.

6. The data processing system for calculating the offset sum of claim 5 wherein the index offset value has a bit width of four.

7. A method for calculating an offset sum, comprising the steps of wherein said symmetrical range of addresses is within a decimal range off $-2^{(n-1)}$ to $-1$ and $+1$ to $+2^{(n-1)}$:
   receiving an instruction having an index offset value, the instruction having a first portion for specifying an operation to be executed and a second portion for specifying the index offset value having both a sign portion and a magnitude portion;
   receiving a first address value from one of an internal memory and an external address source;
   decoding the instruction to provide a plurality of control signals in response to receiving the instruction;
   storing the first address value in a register during execution of the instruction;
   inverting the sign portion of the index offset value to provide an inverted offset sign value; and
   adding each of the first address value, the sign portion and the magnitude portion of the index offset value, and the inverted offset sign value to generate the offset sum, the offset sum being within a symmetrical range of addresses of the first address value and not being equal to the first address value.

8. The method of claim 7 wherein the operation specified by the instruction is an autoincrementing or an autodecrementing operation.

9. The method of claim 7 wherein the index offset value is either a positive or a negative number, a magnitude of a positive offset number being increased by one and a magnitude of a negative offset number remaining unchanged.

10. The method of claim 7 wherein the index offset value is not equal to zero.

11. The method of claim 7 wherein the index offset value has a bit width of an integer number, n.

* * * * *